United States Patent
Qi et al.

(10) Patent No.: US 7,986,723 B2
(45) Date of Patent: Jul. 26, 2011

(54) DELAY ESTIMATION APPARATUS AND METHOD

(75) Inventors: Yihong Qi, Tokyo (JP); Ryuji Kohno, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 385 days.

(21) Appl. No.: 11/922,492

(22) PCT Filed: Jul. 6, 2005

(86) PCT No.: PCT/JP2005/012885
§ 371 (c)(1),
(2), (4) Date: Feb. 11, 2009

(87) PCT Pub. No.: WO2007/004307
PCT Pub. Date: Jan. 11, 2007

(65) Prior Publication Data
US 2009/0207885 A1      Aug. 20, 2009

(51) Int. Cl.
*H04B 1/00*   (2006.01)
(52) U.S. Cl. ........ 375/130; 375/224; 375/147; 375/150; 375/343; 375/341; 370/203; 370/208; 370/209; 455/42; 455/43; 455/44; 455/45
(58) Field of Classification Search .......... 375/224, 375/130, 147, 150, 343, 341; 370/203, 208, 370/209; 455/42, 43, 44, 45
See application file for complete search history.

(56) References Cited

U.S. PATENT DOCUMENTS

| | | | |
|---|---|---|---|
| 7,769,078 B2 * | 8/2010 | Cairns et al. | 375/147 |
| 2002/0141486 A1 * | 10/2002 | Bottomley et al. | 375/148 |
| 2003/0069025 A1 * | 4/2003 | Hoctor et al. | 455/456 |
| 2004/0141549 A1 * | 7/2004 | Abraham et al. | 375/150 |
| 2006/0104387 A1 * | 5/2006 | Sahinoglu et al. | 375/340 |
| 2009/0296783 A1 * | 12/2009 | Qi et al. | 375/130 |

FOREIGN PATENT DOCUMENTS

WO   WO 2005/040845 A1   5/2005

OTHER PUBLICATIONS

Messer, H., et al., "Passive Time Delay Estimation in Non-Gaussian Noise," IEEE Transactions on Signal Processing IEEE, USA, vol. 47, No. 9, pp. 2531-2534, Sep. 1999.

Chin-Der, W., et al., "Estimation and Analysis of Signal Arrival Time for UWB Systems," Vehicular Technology Conference, IEEE, pp. 3560-3564, Sep. 26, 2004.

Gueuning, F.E., et al., "Accurate Distance Measurement by an Autonomous Ultrasonic System Combining Time of Flight and Phase Shift Methods," IEEE Transactions on Instrumentation and Measurement, vol. 46, No. 6, pp. 1236-1239, Dec. 1997.

* cited by examiner

*Primary Examiner* — Kenneth Lam
(74) *Attorney, Agent, or Firm* — Jacobson Holman PLLC

(57) ABSTRACT

Delay estimation apparatus and method, comprising: a correlation step which a correlation function between a received signal and a supplied template waveform is generated, AD conversion step at which said correlation output generated at said correlation step is uniformly sampled into discrete samples; and arithmetic operation step at which a time delay estimate of the received signal based on said discrete samples generated at said AD conversion step is computed, wherein a selection criterion depending on the digital sampling frequency used at said AD conversion means is checked, if said selection criterion is satisfied, computes the time delay estimate based on the direct pick method, and if said selection criterion does not hold, computes the time delay estimate based on the simplified maximum likelihood (ML) method.

4 Claims, 7 Drawing Sheets

US 7,986,723 B2

DELAY ESTIMATION APPARATUS AND METHOD

This is a national stage of PCT/JP05/012885 filed Jul. 6, 2005 and published in English.

TECHNICAL FIELD

The present invention relates to a time delay estimation apparatus and method in a wireless communication system.

BACKGROUND ART

In a wireless communication system, a radio signal propagates from a transmitter to a receiver. The time delay of the received signal corresponds to the length of the specific propagation path. Delay estimation has long been recognized as an important topic in wireless communications, and is closely related to other important issues such as channel estimation and ranging. Specifically, in the recent fast-developing UWB (ultra-wide band) technologies, delay estimation has been acknowledged as a main approach to ranging with high precision.

For simplicity, consider a signal propagates via a single path from a transmitter to a receiver. The received signal consists of the transmit signal with a certain time delay and additive noise. In the continuous time domain, a typical delay estimation method is to detect the time instant corresponding to the peak of a correlation function obtained by correlating the received signal and a template waveform equivalent to the transmit signal. In practice, digital (uniform) sampling is an indispensable operation in a wireless system. In this invention, digital sampling on the correlation function is assumed. Hence, the continuous function is converted into multiple discrete samples. The simplest delay estimation method based on these samples is to find the time instant associated with the largest sample, which is referred to as the direct-pick method herein. This method has the advantage of simplicity, yet has a main limitation that the estimation error can be very large with a low sampling frequency. In order to improve the estimation accuracy, interpolation and digital filtering techniques are adopted in delay estimation, where sample data are further processed. For example, in [1] ([1] E. F. Gueuning, M. Varlan, E. C. Eugene and P. Dupuis, "Accurate distance measurement by an autonomous ultrasonic system combining time-of-flight and phase-shift methods," IEEE Trans. Instrumentation and Measurement, vol. 46, no. 6, pp. 1236-40, December 1997.), a digital lowpass filter is implemented to remove unwanted spectral signal components caused by sampling. These schemes, however, do not take into account such important information as the pre-knowledge of the autocorrelation function of the transmit signal and statistical characteristics of noise components in the sample data.

DISCLOSURE OF THE INVENTION

This invention presents a delay estimation apparatus and method for a wireless communication system, which can mitigate the estimation error due to digital sampling in an efficient and robust manner. Specifically, the simplest direct-pick method and a delay estimation scheme based on a simplified maximum likelihood solution are combined by a selection criterion depending on the digital sampling frequency. Compared with the existing methods, the delay estimation method according to this invention utilizes both auto-correlation information of transmit signals and statistical characteristics of noise components of sample data, and can achieve high-accuracy delay estimation at a low computation cost.

The delay estimation apparatus comprises: correlation means which generates a correlation output based on a received signal and a supplied template waveform, AD conversion means which uniformly samples said correlation output generated by said correlation means into discrete samples; and arithmetic operation means which computes a time delay estimate of the received signal based on said discrete samples generated by said AD conversion means, wherein said arithmetic operation means checks whether a selection criterion depending on the digital sampling frequency used at said AD conversion means is satisfied, if said selection criterion is satisfied, computes the time delay estimate based on the direct-pick method, and if said selection criterion does not hold, computes the time delay estimate based on the simplified maximum likelihood (ML) method.

And the delay estimation apparatus according to said invention, wherein if said selection criterion does not hold, said arithmetic operation means computes time delay estimate based on the following simplified maximum likelihood (ML) solution $$\hat{\tau} = \frac{t_Z^T W_Z h(t_Z)}{1_Z^T W_Z h(t_Z)},$$

where $h(t_z)$ is a vector containing Z samples selected from said discrete samples generated by said AD conversion means, $t_z$ is a vector containing time instants associated with said samples $h(t_z)$, $1_z$ is a vector containing only one's, and $W_z$ is a matrix determined by the statistic information of the noise components in said samples $h(t_z)$. Said samples $h(t_z)$ are selected in such a manner that $h(t_z)$ represents the peak portion of said correlation function output from said correlator.

The delay estimation method comprises: a correlation step which a correlation function between a received signal and a supplied template waveform is generated, AD conversion step at which said correlation function generated at said correlation step is uniformly sampled into discrete samples; and arithmetic operation step at which a time delay estimate of the received signal based on said discrete samples generated at said AD conversion step is computed, wherein a selection criterion depending on the digital sampling frequency used at said AD conversion step is checked, if said selection criterion is satisfied, computes the time delay estimate based on the direct-pick method, and if said selection criterion does not hold, computes the time delay estimate based on the simplified maximum likelihood (ML) method.

And the delay estimation method according to said invention, wherein if said selection criterion does not hold, a time delay estimate is evaluated by using the following simplified ML solution $$\hat{\tau} = \frac{t_Z^T W_Z h(t_Z)}{1_Z^T W_Z h(t_Z)},$$

where $h(t_z)$ is a vector containing Z samples selected from said discrete samples generated at said AD conversion step, $t_z$ is a vector containing time instants associated with said samples $h(t_z)$, $1_z$ is a vector containing only one's, and $W_z$ is a matrix determined by the statistic information of the noise components in said samples $h(t_z)$. Said samples $h(t_z)$ are selected in such a manner that h(t_z) is a sufficient representation of the peak portion of said correlation function generated by said correlator.

BEST MODE FOR CARRYING OUT THE INVENTION

An embodiment of the invention is now described in detail by referring to the aforementioned figures.

Figure 1:
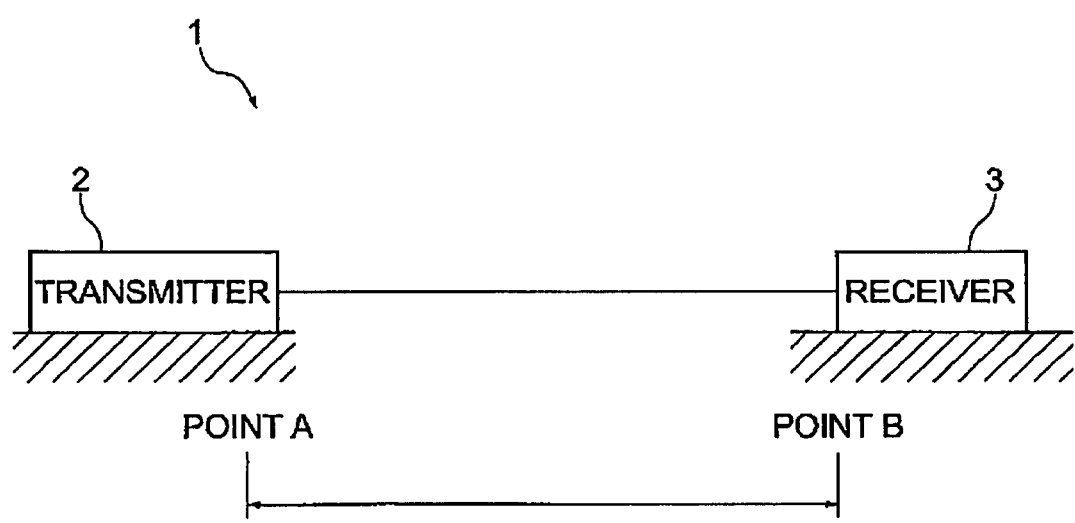
FIG. 1 is a structural diagram of a communication system for illustrating the invention.

FIG. 1 shows the system configuration of a communication system 1 according to the invention. The communication system 1 is a system for wireless communication between a point A and a point B, employing the UWB (Ultra Wide Band) technology. The communication system 1 consists of a transmitter 2 sited at the point A and a receiver 3 sited at the point B.

The UWB technology is a technology for short-range radio communication, involving the intentional generation and transmission of radio frequency energy that spreads over a very large frequency range, overlapping several frequency bands allocated to radio communication services. The transmitter 2 and the receiver 3 can transmit and receive UWB signals, respectively. A UWB signal is defined as a radio signal with −10 dB bandwidth of at least 500 MHz or a fractional bandwidth greater than 0.2.

Figure 2:
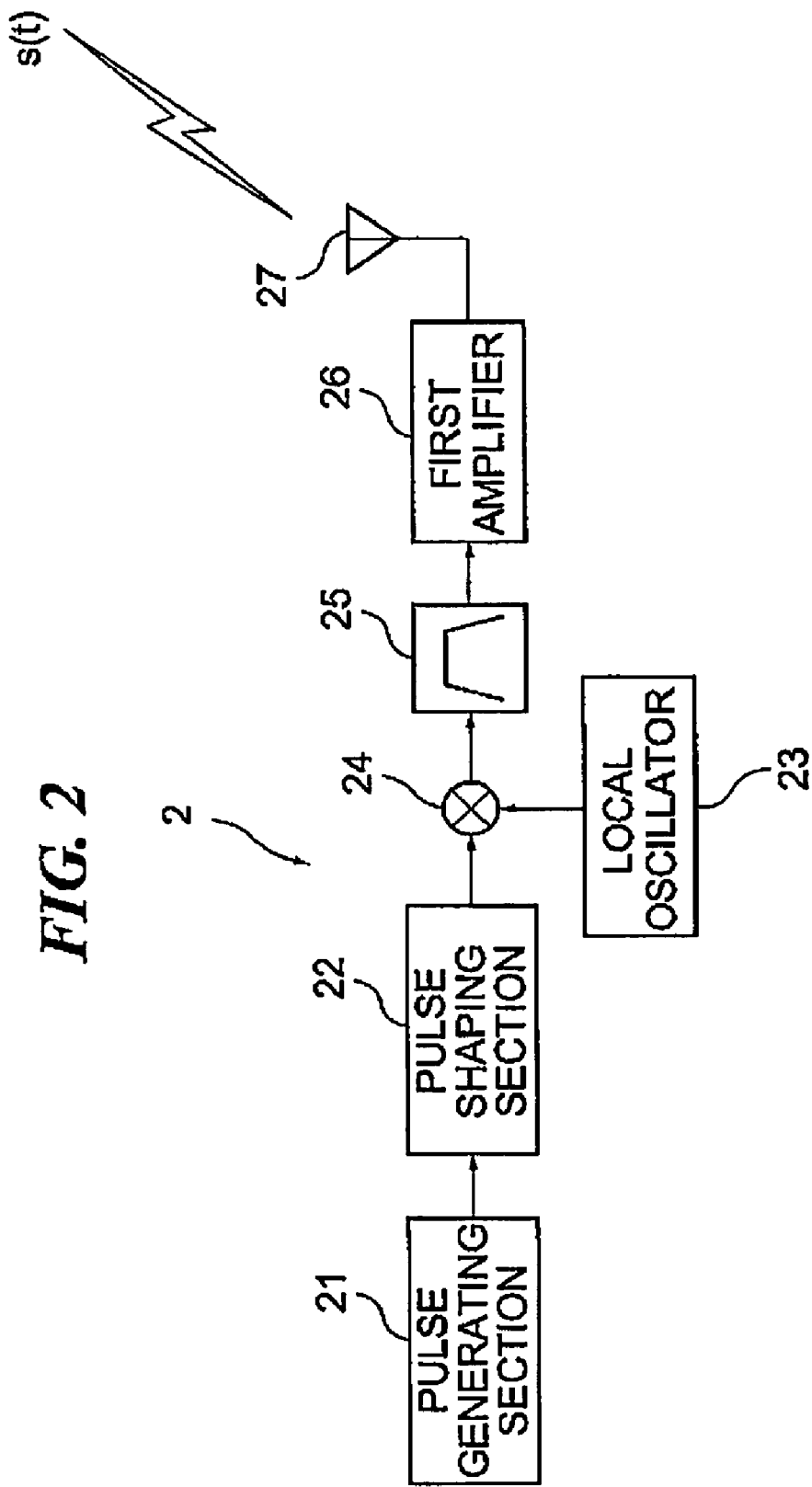
FIG. 2 is a block diagram of a transmitter for illustrating the invention.

FIG. 2 shows the block diagram of the transmitter 2 that generates a UWB signal.

The transmitter 2 comprises a pulse generating section 21 which generates a basic UWB signal, a pulse shaping section 22 which shapes the UWB signal generated by the pulse generating section 21 according to certain spectral criteria, a mixer circuit 24 which performs frequency conversion on the output signal from the pulse shaping section 22, a local oscillator 23 which supplies a frequency reference signal to the mixer circuit 24, a filter 25 for limiting the bandwidth of the frequency-converted signal generated by the mixer circuit 24, a first amplifier 26 which amplifies the output signal from the filter 25, an antenna 27 which radiates the output signal from the first amplifier 26.

The pulse generating section 21 generates a sequence of UWB pulses as a UWB signal. A UWB pulse is a signal whose bandwidth is inverse of the pulse duration usually on the order of a nanosecond or a fraction of a nanosecond. The pulse sequence generated by the pulse generating section 21 is sent directly to the pulse shaping section 22.

The pulse shaping section 22 shapes the UWB output signal generated by the pulse generating section 21 according to a predetermined spectral requirement.

The local oscillator 23 generates a frequency reference signal for frequency conversion. The frequency of the reference signal may be precisely controlled by an unillustrated PLL (Phase-Locked Loop) circuit or the like.

The mixer circuit 24 converts the output signal from the pulse shaping section 22 into a desired frequency band by using the frequency reference signal generated from the local oscillator 23.

The bandpass filter 25 limits the output signal from the mixer circuit 24 within a desired frequency band by removing the unwanted spectral components beyond the desired band. The output signal from the filter 25 is directly fed to the first amplifier 26.

The first amplifier 26 amplifies the output signal from the filter 25 and further modifies the signal in such a way that the signal spectrum is flat within the desired frequency band.

An antenna 27 radiates the output signal generated from the first amplifier 26 as electro-magnetic waves into space which is to be received by the receiver 3 at the point B. Hereinafter, the output signal generated by the antenna 27 is denoted by s(t).

Figure 3:
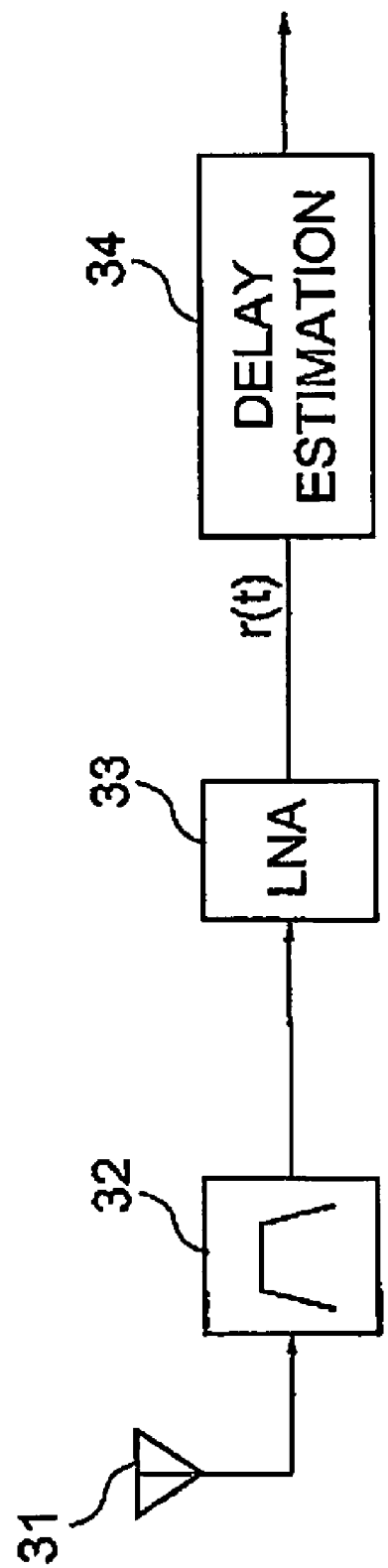
FIG. 3 is a block diagram of a receiver, which contains the delay estimation apparatus according to the invention.

FIG. 3 shows the block diagram of the receiver 3, which receives the UWB signal transmitted from the transmitter 2.

Figure 4:
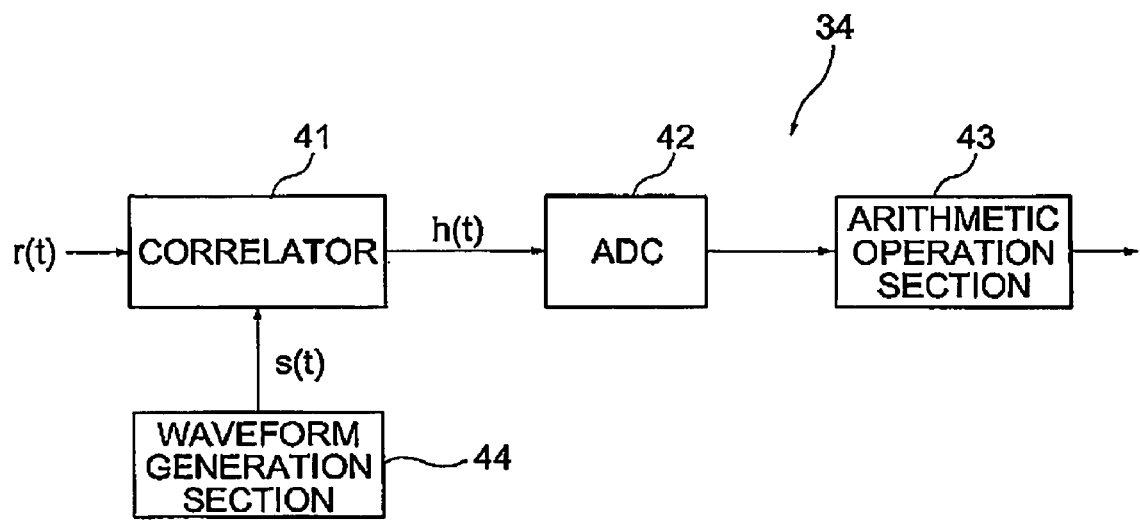
FIG. 4 is a block diagram of the delay estimation apparatus according to the invention.

The receiver 3 comprises an antenna 31, which captures the radio signal transmitted from the transmitter 2 in the air, a bandpass filter 32 which removes the unwanted spectral components of the output signal from the antenna 31, a low-noise amplifier (LNA) 33 which amplifies the output signal from the filter 32, a delay estimation apparatus 34 which computes a delay estimate of the output signal from the LNA 33 and is specified in FIG. 4.

The antenna 31 captures the UWB radio signal transmitted from the transmitter 2 in the air, and converts the radio signal into a corresponding electrical signal.

The bandpass filter 32 limits the output signal from the antenna 31 within a desired frequency band by removing unwanted spectral components beyond the desired bandwidth.

The LNA 33 amplifies the output signal from the filter 32 in such a manner that amplification of the noise component contained in the signal is controlled under certain level. The amplified signal generated by the LNA 33 is supplied to the delay estimation apparatus 34. Hereinafter, The signal generated by the LNA 33 is denoted by r(t).

The delay estimate apparatus 34 computes a delay estimate of the output signal from the LNA 33 and is specified in FIG. 4.

FIG. 4 shows the block diagram of the delay estimation apparatus corresponding to the block 34 in the receiver 3, which computes the time delay estimate of the output UWB signal generated from the LNA 33 in the receiver 3.

The delay estimation apparatus comprises a waveform generation section 44 which generates a template waveform equivalent to the transmit signal s(t) transmitted from the transmitter 2, a correlator 41 which computes the correlation function h(t) between the output signal r(t) generated by the LNA 33 in receiver 3 and the template waveform s(t) supplied by the waveform generation section 44, an analog-digital converter (ADC) 42 which uniformly samples the correlation output h(t) generated by the correlator 41 into discrete samples, an arithmetic operation section 43 computes a delay estimate of the signal r(t) output from the LNA 33 by using the discrete samples generated from the ADC 42.

The waveform generating section 44 generates a template waveform. The template waveform is equivalent to the transmit signal s(t) generated by the transmitter 2. The output signal from the waveform generating section 44 is sent to the correlator 41.

The correlator 41 computes a correlation function h(t) between the received signal r(t) output from the LNA 33 in the receiver 3 and the template waveform s(t) generated from the waveform generating section 44. The output signal h(t) from the correlator 41 is an analog signal, and is supplied to the ADC (analog-to-digital converter) 42.

The ADC 42 uniformly samples the output analog signal h(t) from the correlator 41 into discrete samples, and sends the discrete samples to the arithmetic operation section 43.

The arithmetic operation section 43 computes a time delay estimate of the received signal r(t) generated by the LNA 33 based on the discrete samples output from the ADC 42 by using a delay estimation scheme to be discussed next.

The application of the delay estimation apparatus and method according to this invention is not limited to the UWB system as just described, and can be adopted in any communication system with digital sampling.

Figure 7:
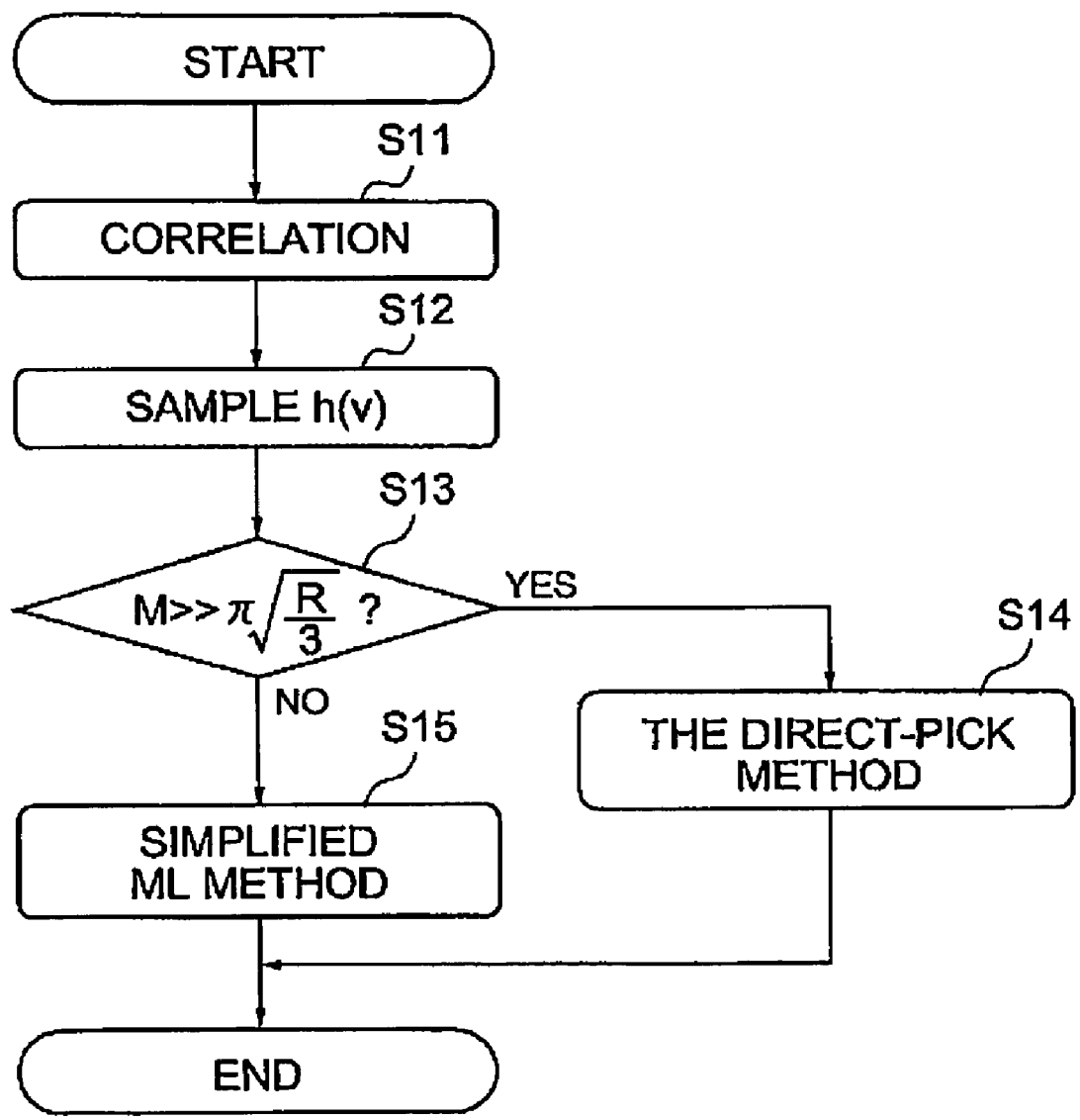
FIG. 7 is a flowchart illustrating the delay estimation procedure according to the invention, which corresponds to the block diagram in FIG. 4.

The delay estimation scheme adopted in the delay estimation apparatus given in FIG. 4 is to be presented in detail next, which represents the main contribution of this invention. The corresponding flowchart is shown in FIG. 7.

The delay estimation scheme according to this invention combines the direct-pick method and the simplified ML method by using an appropriate selection criterion. The simplified ML method incorporates both the autocorrelation function of a transmit signal and statistical characteristics of noise components of discrete samples of a correlation function in an efficient manner.

Consider a signal s(t) traveling from a transmitter 2 to a receiver 3 via a single-path propagation. Received signal r(t) is given by the following equation $$r(t)=As(t-\tau)+n(t), \quad (1)$$

where A and $\tau$ are the amplitude and the time delay of the signal s(t), respectively, and n(t) is a white Gaussian noise process with spectral density $N_0$. The delay $\tau$ corresponds to the length of the propagation path between the transmitter 2 and the receiver 3.

Our delay estimation scheme consists of the following five steps. The description and rationale of each step are presented along with reference to the corresponding components in the flowchart FIG. 7 and the block diagram FIG. 4.

First, compute the correlation function between the received signal r(t) and the template waveform s(t), which is associated with the step S11 in FIG. 7 and the correlator 41 in FIG. 4. The correlation function, denoted by h(v), is given in the following equation $$h(v)=\int r(t)s(t-v)dt=Ag(v-\tau)+z(v), \quad (2)$$

where g(v) is the autocorrelation function of s(t) as $$g(v)=\int s(t)s(t-v)dt, \quad (3)$$

and z(v) is a noise component as $$z(v)=\int n(t)s(t-v)dt. \quad (4)$$

The noise z(v) can be shown as a correlated Gaussian process. Note that the signal waveform s(t) and hence its autocorrelation function g(v) are known at the receiver 3 in advance.

Second, at step S12, uniformly sample the correlation function h(v) at the ADC 42. Let the sampling interval of the ADC 42 be T, the over-sampling ratio be M, and the effective bandwidth of the signal s(t) be $\beta$. The over-sampling ratio M is defined by the ratio between the sampling frequency 1/T and the effective bandwidth $\beta$, i.e., $M=1/\beta T$. Sampling h(v) of equation (2) yields the following equation $$h(t_n)=Ag(t_n-\tau)+z(t_n), \text{ for n=1, 2, \ldots, N,} \quad (5)$$

where $t_n=t_0+nT$, and $t_0$ is chosen such that |h(t)| is sufficiently small for $t>t_N$ and $t<t_1$. The expression |a| means the absolute value of a quantity "a". The noise term $z(t_n)$'s of the samples can be shown as correlated Gaussian random variables with the zero mean and covariance matrix $$V_N = N_0 \begin{pmatrix} g(0) & g(T) & \ldots & g((N-1)T) \\ g(T) & g(0) & \ldots & g((N-2)T) \\ \vdots & \vdots & \ddots & \vdots \\ g((N-1)T) & g((N-2)T) & \ldots & g(0) \end{pmatrix} \quad (6)$$

By defining $$t_N=[t1\ t2\ \ldots\ t_N]^T, \quad (7)$$

$$h(t_N)=[h(t1)h(t2)\ldots h(t_N)]^T, \quad (8)$$

$$gt_N(v)=[g(t_1-v)g(t_2-v)\ldots g(t_{N-v})]^T, \quad (9)$$

where superscript "T" denotes transpose, the probability density function of h(t) conditioned on $\tau$ can be expressed as $$p_\tau(h(t_N)) = \frac{1}{(2\pi)^{N/2}|V_N|^{1/2}} \cdot \exp\left\{-\frac{1}{2}[h(t)-Ag_t(\tau)]^T \cdot V_N^{-1}[h(t)-Ag_t(\tau)]\right\}. \quad (10)$$

All the arithmetic operations in the following steps are conducted in the delay estimation unit 43.

Third, at step S13, check whether the following condition $$M >> \pi\sqrt{\frac{R}{3}} \quad (11)$$

where ">>" means "much larger than", e.g., "more than 5 times larger". Recall M and R are the over-sampling ratio and the SNR of the received signal r(t), respectively.

Forth, at step S14, if the condition (11) holds, the direct-pick method is adopted for delay estimation. The direct-pick method is to determine the delay estimate as the time instant associated with the largest correlation sample, i.e., $$\hat{T}=\arg\max_{t_n}\{h(t_1), h(t_2), \ldots, h(t_N)\}. \quad (12)$$

Figure 5:
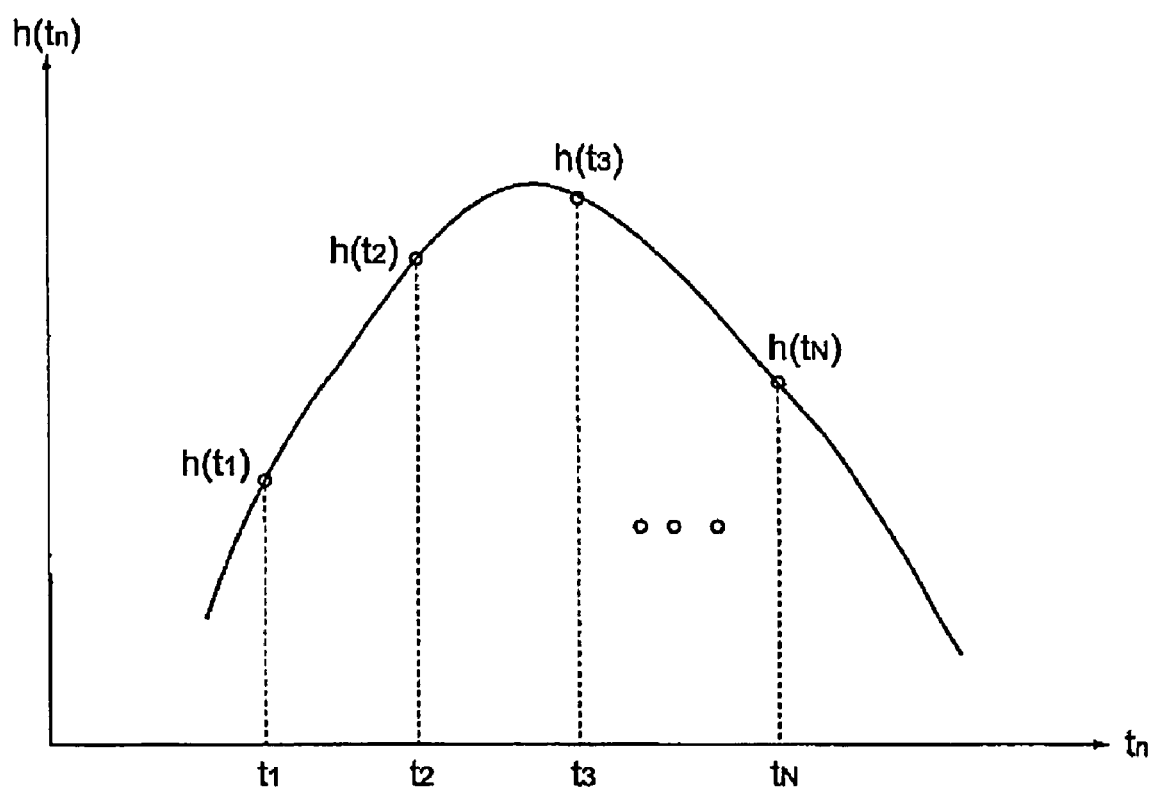
FIG. 5 is a drawing for explaining the direct-pick method.

The graphic illustration of the direct-pick method is shown in FIG. 5, where t3 is the delay estimate in this case. This method has the advantage of simplicity, yet has a main limitation that the estimation error can be very large at a low over-sampling ratio M. Specifically, the error variance of the delay estimate in equation (12) is derived as $$E[(\hat{\tau}-\tau)^2] = \frac{1}{4\pi^2\beta^2 R} + \frac{T^2}{12}, \quad (13)$$

where symbol "E" is to take expectation. The first term on the right-hand side (RHS) of the above equation represents "inherent error" caused by the noise n(t) in equation (1), the effective bandwidth $\beta$ and the SNR R of the received signal, which is independent of the sampling operation, and the second term on the RHS is solely due to digital sampling. When the first term is sufficiently larger than the second term, which is equivalent to equation (11), the estimation error due to sampling can be negligible. In other words, when the relation equation (11) is satisfied, the direct-pick method can perform delay estimation with negligible errors caused by sampling.

Fifth, at step S15, if the condition equation (11) cannot be satisfied, delay estimation based on the simplified ML method is preformed, which consists of the following two steps. First, select Z consecutive samples $h(t_m), h(t_{m+1}), \ldots, h(t_{m+Z-1})$ with $2 \leq Z \leq N$, where m is determined according to equation (18). Then, the delay estimate is evaluated by using equation (19). Equations (18) and (19) are presented along with derivation and advantages of this method next.

Consider the delay estimation based on the standard ML method, that is, to find a delay estimate $\hat{T}$ such that the probability density function $p_T(h(t))$ given in equation (10) is maximized. The formulation of the standard ML method has the advantage of automatically incorporating both the autocorrelation function $g(v)$ and the statistic characteristics of noise term $z(t_n)$'s in the sample data (see equation (5)). However, because of the nonlinearity of the expression $g(v)$, the computation cost of the standard ML estimation is considerably high. In order to reduce the computation cost, the Taylor series expansion of $g(v)$ around $v=0$, specifically $|v| \ll 1/\sqrt{2\pi}\beta$ is derived as the following equation $$g(v) = g(0) + g'(0) \cdot v + \frac{1}{2!} \cdot g''(0) \cdot v^2 + \frac{1}{3!} \cdot g'''(0) \cdot v^3 + o(v^4) \quad (14)$$
$$= 1 - 2\pi^2 \beta^2 v^2 + o(v^4).$$

By using the above approximation, the ML estimate of $\tau$ is shown as the following simple algebraic formula, $$\hat{\tau} = \frac{t_N^T V_N^{-1} h(t_N)}{1_N^T V_N^{-1} h(t_N)}, \quad (15)$$

$$= \frac{t_N^T W_N h(t_N)}{1_N^T W_N h(t_N)}, \quad (16)$$

with $$W_N = \begin{pmatrix} |\tilde{V}_{N(1,1)}| & |\tilde{V}_{N(1,2)}| & \ldots & |\tilde{V}_{N(1,N)}| \\ |\tilde{V}_{N(2,1)}| & |\tilde{V}_{N(2,2)}| & \ldots & |\tilde{V}_{N(2,N)}| \\ \vdots & \vdots & \ddots & \vdots \\ |\tilde{V}_{N(N,1)}| & |\tilde{V}_{N(N,2)}| & \ldots & |\tilde{V}_{N(N,N)}| \end{pmatrix}, \quad (17)$$

where $\tilde{V}_{N(n,m)}$ is a square matrix of order (N−1) obtained by removing the n-th row and the m-th column of $V_N$, $|A|$ is the determinant of matrix A, and $1_N=(1\ 1\ \ldots\ 1)^T$ is a vector of order N. Analytically speaking, equation (15) and (16) are equivalent. Yet equation (16) has the advantage to avoid evaluation of the inverse of $V_N$, which may cause unstable computation result due to possible (or near) rank deficiency of $V_N$.

In addition, using a smaller amount of sample data can further reduce the computation load. Specifically, select Z consecutive samples $h(t_m), h(t_{m+1}), \ldots, h(t_{m+Z-1})$ with $2 \geq Z \geq N$, where m is determined such that the summation $\Sigma_{z=0}^{Z-1} h(t_{n+z})$ is maximized among $n=1, 2, \ldots, N-Z+1$, i.e., $$m = \text{maxarg}_n \sum_{z=0}^{Z-1} h(t_{n+z}). \quad (18)$$

Figure 6:
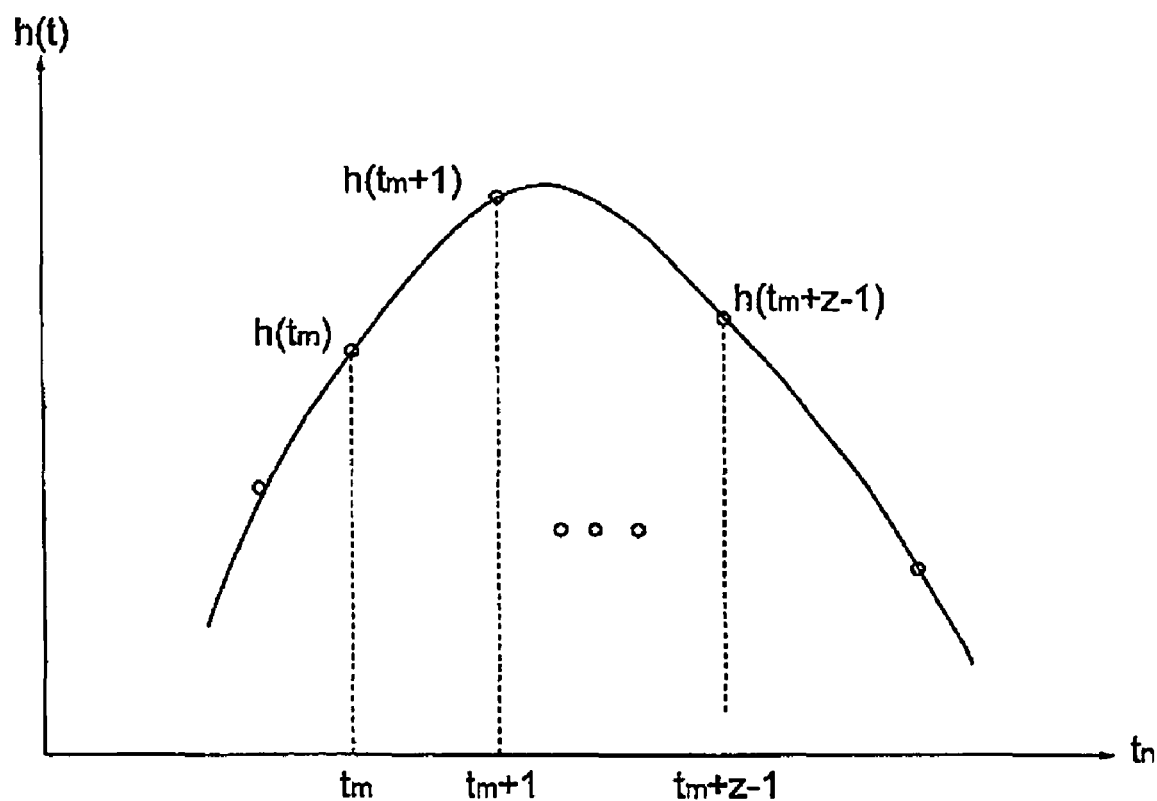
FIG. 6 is a drawing for explaining the simplified maximum likelihood method.

The graphic diagram of the samples selection is shown in FIG. 6, where Z samples are selected in this case.

Then, the delay estimate given in equation (16) can be modified by using these Z samples as $$\hat{\tau} = \frac{t_Z^T W_Z h(t_Z)}{1_Z^T W_Z h(t_Z)}, \quad (19)$$

where $$t_Z = [t_m t_{m+1} \ldots t_{m+Z-1}]^T, \quad (20)$$

$$h(t_Z) = [h(t_m) h(t_{m+1}) \ldots h(t_{m+Z-1})]^T, \quad (21)$$

and $W_Z$ is given in equation (17) with dimension Z. For high over-sampling ratio $M \geq 2$, $Z=2$ can provide an fairly accurate estimate which is close to the theoretical best estimation accuracy. For a smaller M, $Z=3$ or 4 is adopted to achieve a better accuracy. The above method to obtain the delay estimate equation (19) is termed as the simplified ML method.

Now we summarize the four advantages of the delay estimate equation (19). First, it is an algebraic (or closed-form) solution. Compared with the standard ML method, this scheme does not involve iterative searching steps where the complicated expression $g(v)$ is evaluated at each iteration. Second, the computation only uses $Z<N$ samples, instead of all N sample data. The number Z can be as less as 2 at a high over-sampling ratio. Third, estimation of the signal amplitude A and the noise level $N_0$ (See equation (1)) is not required. Forth, although simple, this scheme with $Z=2$ is shown to be optimal in the sense that its error variance converges to the theoretical lower limit as the over-sampling ratio M is sufficiently high. It is acknowledged that utilizing more sample data such as three or four, i.e., $Z=3, 4$, may improve the estimation accuracy at a low over-sampling ratio.

INDUSTRIAL APPLICABILITY

According to the invention, a high-accuracy delay estimation method and apparatus are provided. Compared with existing delay estimation methods, this invention can achieve higher estimation accuracy with a low computational cost.

The invention claimed is:

1. A delay estimation apparatus, comprising:
correlation means which generates a correlation output between a received signal and a supplied template waveform;
analog to digital (AD) conversion means which uniformly samples said correlation output generated by said correlation means into discrete samples; and
arithmetic operation means which computes a time delay estimate of said received signal based on said discrete samples generated by said AD conversion means,
wherein said arithmetic operation means includes a delay estimation procedure which utilizes both autocorrelation information of the transmit signal associated with said received signal and the statistical information of the noise components in said discrete samples generated by said AD conversion means, said arithmetic operation means including a delay estimation procedure which computes a delay estimate of said received signal according to a simplified solution of a maximum likelihood (ML) method, said maximum likelihood (ML) method for finding an estimate such that a probability function summarizing statistics of given observations is maximized, said simplified maximum likelihood solution being given as the following equation $$\hat{\tau} = \frac{t_Z^T W_Z h(t_Z)}{1_Z^T W_Z h(t_Z)},$$

where $h(t_z)$ is a vector containing Z consecutive samples selected from said discrete samples generated by said AD conversion means, $t_z$ is a vector containing time instants associated with said samples $h(t_z)$, $1_z$ is a vector containing only one's, and $W_z$ is an accompanying matrix of the covariance matrix of said samples $h(t_z)$ excluding the noise spectral density factor related to said received signal, said samples $h(t_z)$ being selected in such a manner that $h(t_z)$ represents a peak portion of said correlation function output from said correlator.

2. The delay estimation apparatus according to claim 1, wherein said apparatus is adopted in an Ultra Wide Band (UWB) communication system.

3. A delay estimation method, comprising:

a correlation step at which a correlation function between a received signal and a supplied template waveform is computed;

an analog to digital (AD) conversion step at which said correlation function generated at said correlation step is uniformly sampled into discrete samples; and an arithmetic operation step at which a time delay estimate of said received signal is computed based on said discrete samples generated at said AD conversion step, wherein said arithmetic operation step includes a delay estimation scheme which utilizes both autocorrelation information of the transmit signal associated with said received signal and the statistical information of the noise components in said discrete samples generated at said AD conversion step, said arithmetic operation step including a delay estimation scheme which computes a delay estimate of said received signal according to a simplified solution of a maximum likelihood (ML) method, said maximum likelihood (ML) method for finding an estimate such that a probability function summarizing statistics of given observations is maximized, wherein said simplified maximum likelihood solution is given as the following equation $$\hat{\tau} = \frac{t_Z^T W_Z h(t_Z)}{1_Z^T W_Z h(t_Z)},$$

where $h(t_z)$ is a vector containing Z consecutive samples selected from said discrete samples generated at said AD conversion step, $t_z$ is a vector containing time instants associated with said samples $h(t_z)$, $1_z$ is a vector containing only one's, and $W_z$ is an accompanying matrix of the covariance matrix of said samples $h(t_z)$ excluding the noise spectral density factor related to said received signal, said samples $h(t_z)$ being selected in such a manner that $h(t_z)$ is a sufficient representation of the peak portion of said correlation function generated at said correlation step.

4. The delay estimation method according to claim 3, wherein said method utilizes Ultra Wide Band (UWB) signals.

* * * * *